United States Patent [19]
Horn

[11] 3,743,903
[45] July 3, 1973

[54] SINGLE PHASE MOTOR REVERSING STARTER

[75] Inventor: Robert Horn, Richardson, Tex.

[73] Assignee: Forney Engineering Company, Dallas, Tex.

[22] Filed: Nov. 12, 1970

[21] Appl. No.: 89,188

[52] U.S. Cl. ............................ 318/207 A, 318/227
[51] Int. Cl. ............................................. H02p 1/42
[58] Field of Search ............... 318/202, 203, 207 R, 318/207 A, 227

[56] References Cited
UNITED STATES PATENTS

| | | | |
|---|---|---|---|
| 3,183,425 | 5/1965 | Slawson | 318/227 |
| 3,252,067 | 5/1966 | Derenbecher, Jr. | 318/227 X |
| 3,268,742 | 8/1966 | Pinckaers | 318/227 X |
| 3,304,477 | 2/1967 | Wells et al. | 318/227 X |
| 3,579,064 | 5/1971 | Taylor | 318/227 X |
| 3,444,448 | 5/1969 | Welch | 318/227 X |
| 3,568,019 | 3/1971 | Hirokawa et al. | 318/227 X |

*Primary Examiner*—Gene Z. Rubinson
*Attorney*—John Maier, III, Marvin A. Naigur and John E. Wilson

[57] ABSTRACT

A single phase energized AC motor having a running capacitor connected across V-connected windings thereof for normal operation of the motor, is provided with a solid state single phase starter circuit for energizing the motor in a desired direction of rotation. The starter circuit includes transistor-fired triacs for connecting one line of the alternating current input circuit to the motor and to a corresponding terminal of the capacitor.

1 Claim, 4 Drawing Figures

Patented July 3, 1973        3,743,903

INVENTOR.
ROBERT HORN
ATTORNEY

INVENTOR.
ROBERT HORN

3,743,903

SINGLE PHASE MOTOR REVERSING STARTER

BACKGROUND OF THE INVENTION

This invention relates to reversing starter for single phase-energized AC motors. Single phase motors are known in which the motor acts somewhat like a three phase motor in that a running capacitor is connected across V-connected windings thereof. In the past, such motors have been provided with three phase mechanical starters. However, the resulting control is not entirely reliable, and the main object of this invention is to provide a starter that is considerably more reliable.

A possible solution would be to design a solid state three phase starter for such purpose, but such approach is relatively expensive and presents serious technical problems. The problems are solved according to the present invention by the provision of a solid state single phase reversing starter circuit associated with a power input line of capacitor run single phase AC motors, for connecting such line to a selected terminal of the capacitor.

The invention provides the following advantages over conventional three phase starters: 1) fewer components; 2) elimination of possible line-to-line short circuits; and 3) elimination of isolation normally required between SCRs or triacs and firing circuits.

SUMMARY OF THE INVENTION

In accordance with an illustrative embodiment demonstrating features and advantages of the present invention, there is provided a reversing starter for capacitor run single phase AC motors. The starter includes a solid state switching circuit for connecting one single phase AC power input line to a selected terminal lead of the capacitor of the motor. The other single phase AC input line is connected to the common terminal line of the V-connected windings of the motor. There is also provided forward and reverse signal controlled solid state firing circuits for automatically controlling the operation of the solid state switching circuit in accordance with the desired direction of rotation of the motor.

BRIEF DESCRIPTION OF THE DRAWINGS

The above brief description as well as further objects, features and advantages of the present invention will be more fully appreciated by reference to the following detailed description of a presently preferred but nonetheless illustrative embodiment in accordance with the present invention when taken in connection with the accompanying drawings wherein.

DESCRIPTION OF THE PREFERRED EMBODIMENT

Figure 1:
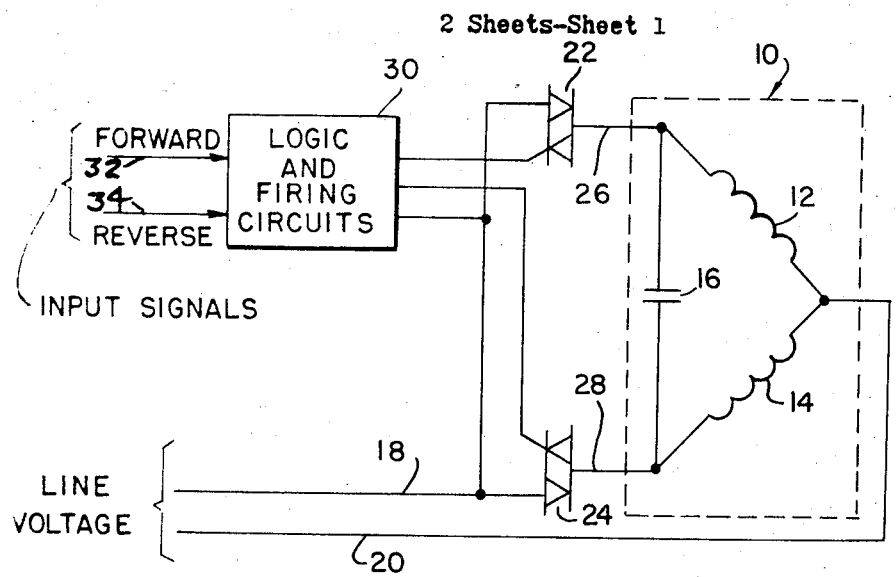
FIG. 1 is a circuit diagram illustrative of the invention.

As shown in FIG. 1, capacitor run single phase motor 10 comprises V-connected windings 12 and 14 cross-connected by a capacitor 16 to form a delta-mode. Thus, when single phase AC power is applied to power input lines 18 and 20 thereof, the motor operates like a three phase AC motor.

Solid state switches comprising triacs 22 and 24 are provided in the connections of line 18 and line 20 to the terminal leads 26 and 28 of motor 10. The triacs 22 and 24 are operated by logic and firing circuits 30 which are in turn controlled by forward and reverse input signals 32 and 34, respectively.

Figure 2:
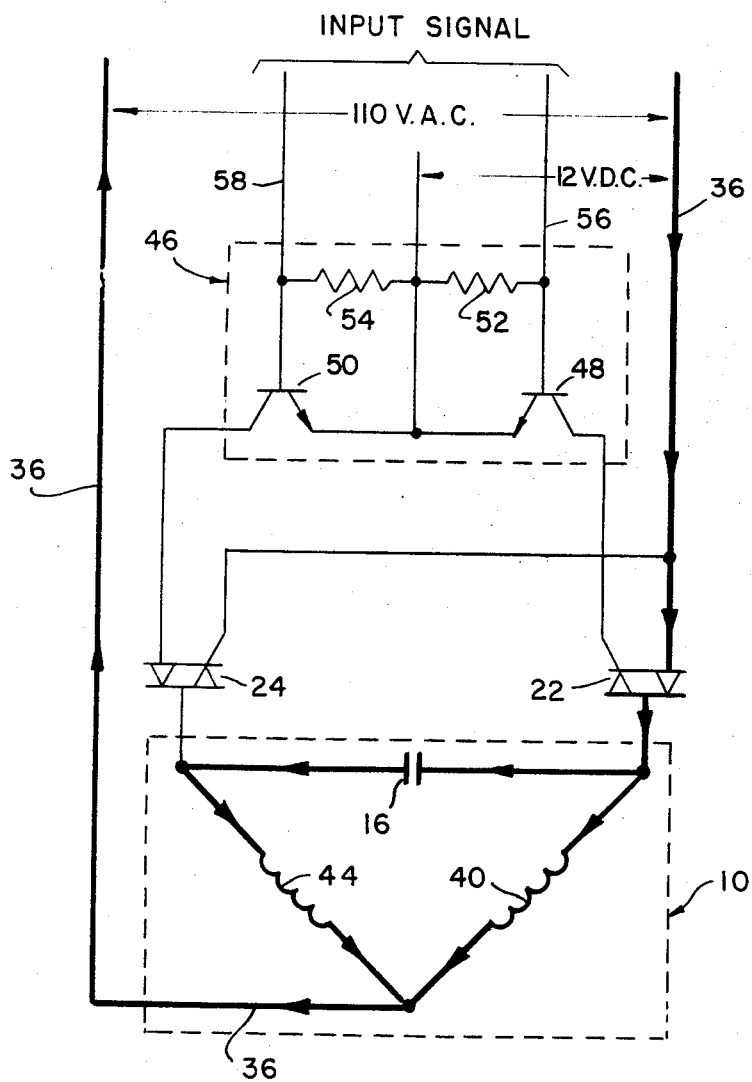
FIG. 2 is a more detailed circuit diagram, with the dark directional lines showing the alternating current flow for the motor running in one direction during the operation of the circuit.
Figure 4:
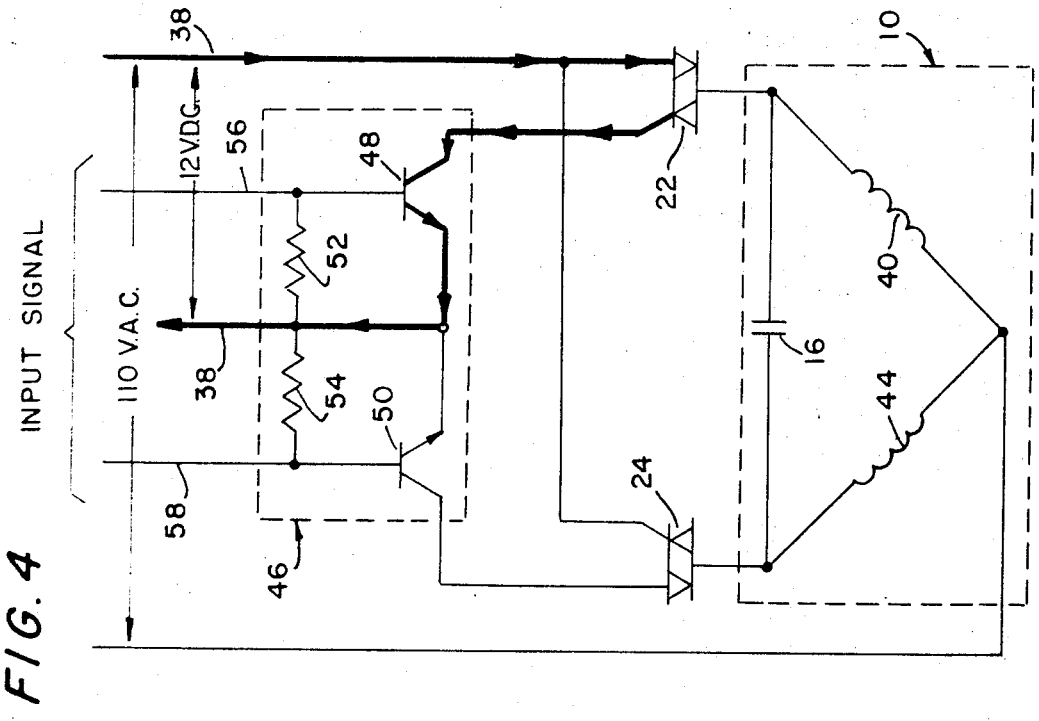
FIG. 4 is a circuit diagram similar to FIG. 2, but with the dark directional lines showing the gate current for firing one of the triacs.
Figure 3:
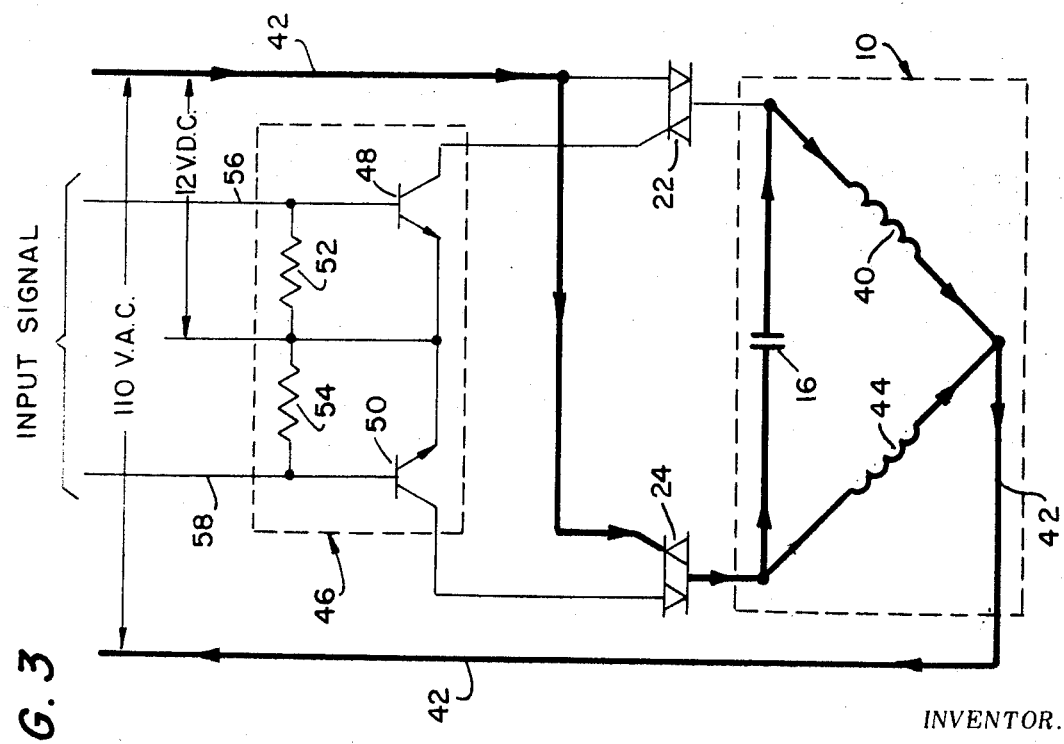
FIG. 3 is a circuit diagram similar to FIG. 2 but with the dark directional lines showing the current flow with the motor reversed.

In the operation of the motor 10, as shown in FIG. 2, a 110 volt AC current flows as indicated by the directional arrows of the heavy line 36 with the motor 10 running in one direction. The 12 volt DC current that fires triac 22 is indicated by the heavy line 38 in FIG. 4. To reverse the motor 10, the other triac 24 is fired and triac 22 is turned off. This connects winding 40 in series with capacitor 16, as indicated by the directional arrows of heavy line 42 in FIG. 3, whereas prior to the reversing of motor 10, the winding 44 was in series with capacitor 16.

The firing circuits 46 for triacs 22 and 24 include transistors 48 and 50, resistors 52 and 54, and input signal leads 56 and 58, respectively. When one triac is activated, the other is deactivated by the transistorized firing circuits in response to the corresponding input signals. The capacitor 16 is always in the circuit, and thus the motor 10 is instantly reversable when one of the triacs 22 or 24 is fired, and the other is turned off.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A solid state reversing starter for a capacitor run single phase alternating current motor having a rotor, and three alternating current input terminals connecting a capacitor and two field windings in a delta arrangement, so that when single phase alternating current power from a common source is applied to two of such terminals directly across one winding, the rotor rotates in a given direction, and when such single phase alternating current power is applied directly to the two terminals across the other winding, the rotor rotates in a direction which is reverse with respect to said given direction;

said solid state reversing starter including a pair of triacs consisting of bidirectional triode thyristors, one of said triacs for each winding, connected directly acorss the terminals of the capacitor in parallel circuit relation with each other, and to one circuit of the single phase alternating current source;

the other circuit of such alternating current source being connected directly to the common terminal of such field windings;

whereby when a selected one of said triacs is fired, the motor is energized by such single phase alternating current source to operate the rotor in one direction, and when the other triac is fired, the motor is energized by such single phase alternating current source to operate the rotor in the reverse direction; and a transistorized triac gating control circuit for selectively firing each of said triacs, consisting of two transistors, one for each triac, having direct current input signal circuits containing a common lead and individual leads connected by equal resistors, and each of said transistors having a corresponding triac firing output circuit connected to a corresponding triac and said common lead;

whereby when a selected rotor forward or reverse direct current signal is applied to the corresponding transistor input circuit, the output thereof fires the corresponding triac, applying single phase alternating current power to the corresponding winding of the motor, which results in rotation of the motor in the desired direction.

* * * * *